2 Sheets—Sheet 1.

J. P. HILYARD & W. E. HOHIMER.
SEED-PLANTER.

No. 174,134. Patented Feb. 29, 1876.

Witnesses:
John Branham
H. J. Cantrell

Inventors:
James Powel Hilyard
William Elias Hohimer

2 Sheets—Sheet 2.
J. P. HILYARD & W. E. HOHIMER.
SEED-PLANTER.
No. 174,134. Patented Feb. 29, 1876.
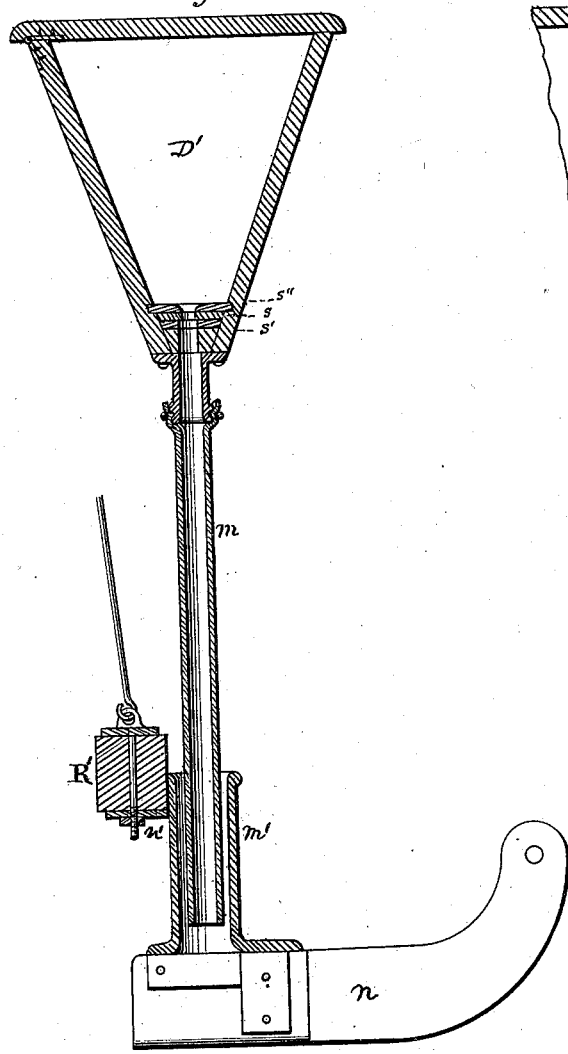
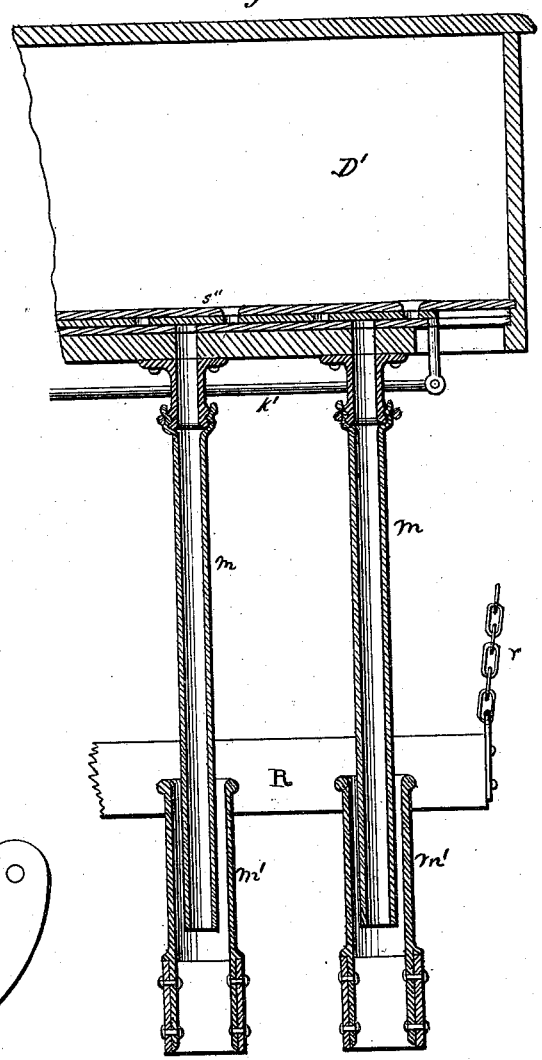
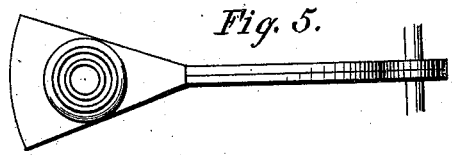
Witnesses:
John Branham
H. J. Cantrell
Inventors:
James Powel Hilyard
William Elias Hohimer

UNITED STATES PATENT OFFICE.

JAMES P. HILYARD AND WILLIAM E. HOHIMER, OF FALL RIVER TOWNSHIP, GREENWOOD COUNTY, KANSAS.

IMPROVEMENT IN SEED-PLANTERS.

Specification forming part of Letters Patent No. 174,134, dated February 29, 1876; application filed August 29, 1873.

*To all whom it may concern:*

Be it known that we, JAMES POWEL HILYARD and WILLIAM ELIAS HOHIMER, of Fall River township, county of Greenwood and State of Kansas, have invented an Improvement in Seed-Planters, of which the following is a specification:

This invention relates to improvements in seed-planters; and consists in the combination and arrangement of devices, as will be hereinafter more fully described, and pointed out in the claim.

Figure 1:
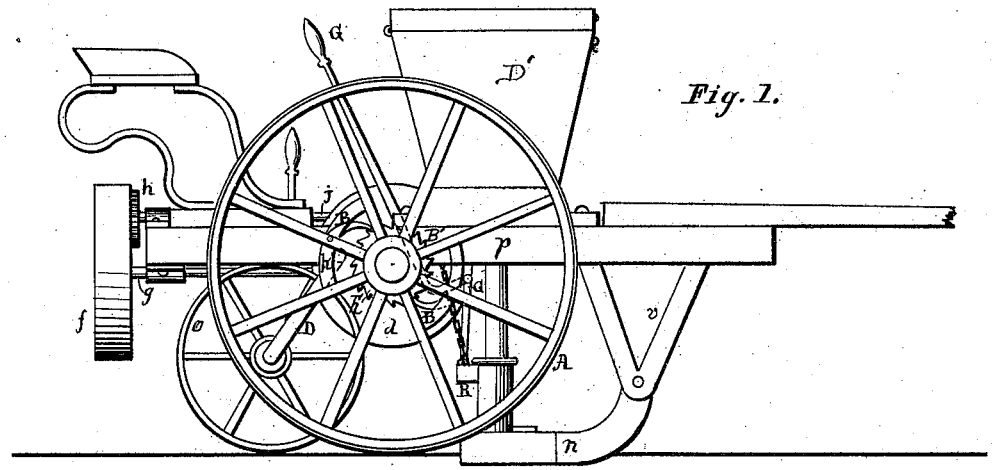
Figure 2:
Figure 2:
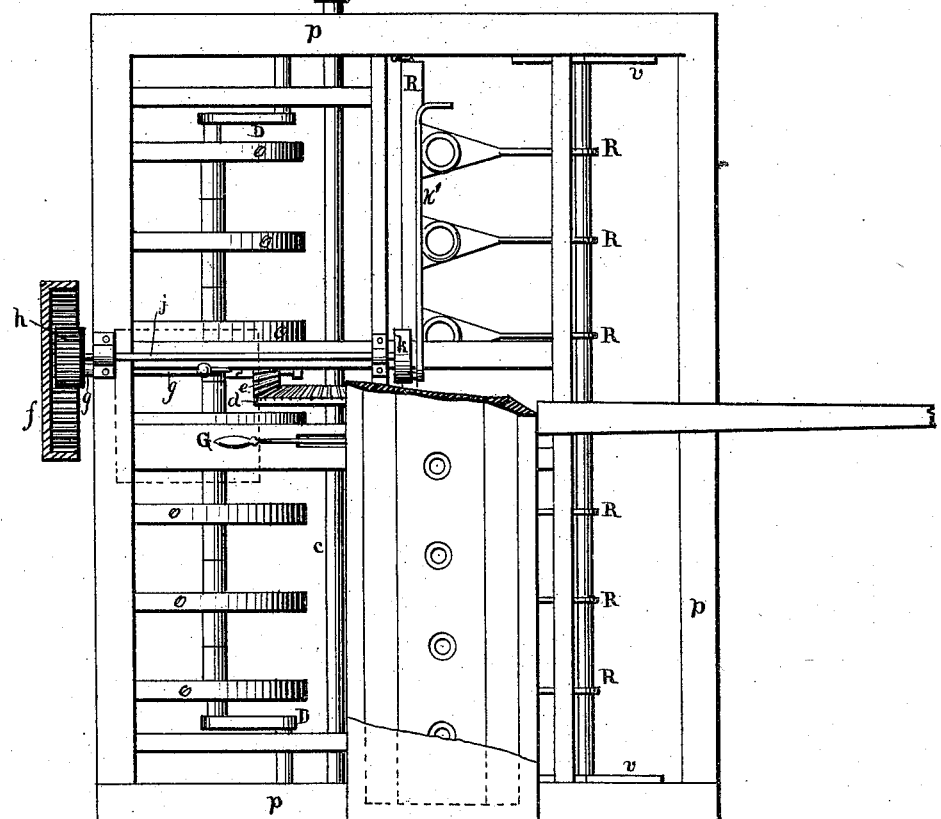

In the drawing, Figure 1 is a side elevation of our improved machine. Fig. 2 is a top or plan view, with a portion broken away to show the seeding devices. Figs. 3, 4, and 5 are detail views of different parts of the machine.

Like letters refer to like parts in all the figures.

A A represent the ground or drive wheels, having spring-pawls B, which engage with the ratchets B' upon shaft or axle $c$ for revolving the same. $p$ is a quadrangular frame mounted upon shaft $c$. D' is a long seed-box, extending across the front of the machine, for the reception of the seed to be planted. $s$ is the seed-slide, formed of a piece of polished steel, working within the seed-box, and immediately above the bottom piece $s'$. This slide is provided with double the number of openings in the bottom piece, for the purpose hereinafter more fully explained.

The bottom piece is plated with steel or iron the same thickness as the seed-slide, and has a series of openings therein, through which the seed passes to the discharge-spouts. Two pieces of steel or iron are placed on each side of the seed-box, and far enough apart to form grooves for the seed-slide to work in. Immediately above the seed-slide is a piece of polished steel, $s''$, grooved into the sides of the seed-box, and having a series of openings reamed out in oblong shape, and arranged to alternate with those in the bottom piece of the seed-box, so that the seed-slide will deliver the seed through the openings in the bottom piece of the seed-box, both in its forward and backward movement, into the discharge-spouts, which conduct it into the furrows formed in the ground. The seed-slide $s$ receives an endwise or reciprocating movement through the medium of the bevel-pinion $d$ on shaft $c$, meshing with small bevel-pinion $e$, which communicates motion through shaft $g$ to large spur-pinion $f$, which meshes with small spur-pinion $h$, and which operates pitman-wheel $k$ through the medium of shaft J, said pitman-wheel communicating an endwise or reciprocating movement to the seed-slide by means of the connecting-rod $k'$. $g'$ is a spring foot-lever secured to shaft $g$, for throwing the seed-slide in and out of gear with the operating mechanism. Immediately below the openings in the bottom piece of the seed-box are the discharge-tubes, the upper portions of which are formed of rubber tubes $m$, or other suitable material, which discharge the seeds into the cast-iron tubes $m'$, formed on the rear ends of the knives or openers $n$, which form the furrows in the ground, into which the seed is deposited. These knives or openers $n$ curve upward, and are journaled on the shaft R, which is journaled in the braces $v$, rigidly secured to the frame $p$. The tubes $m'$ are provided with a flange, $n'$, to which is secured the cross-bar R'. This cross-bar keeps the knives or openers in their proper relative position, and to this cross-bar is attached the lower end of a lever, G, whereby said tubes or discharge-spouts, with the knives or openers, can be adjusted to raise them out of the ground. The upper end of lever G is secured in a notched plate by means of a spring-catch, whereby the knives or openers can be held either in or out of the ground, as desired.

Immediately in rear of the knives or openers are a series of covering-wheels, $o$, corresponding with the number of knives or openers used. These covering-wheels are journaled upon shaft D, and arranged thereon to act separate and independent of each other; and their object is to cover and press the seed into the ground after being discharged into the furrows formed by the knives or openers. $r$ are chains secured to the cross-bar R, extending back and secured to frame $p$, for the purpose of holding the knives or openers in their proper places.

The operation of the machine is deemed obvious from the foregoing description.

We claim as our invention—

The combination, with the discharge spouts or tubes and knives or openers, of the covering-wheels journaled on the crank-shaft, and arranged to act separate and independent of each other, substantially in the manner shown and described.

JAMES POWEL HILYARD.
WILLIAM ELIAS HOHIMER.

Witnesses:
JOHN BRANHAM,
H. J. CANTRELL.